United States Patent [19]

Munakata et al.

[11] Patent Number: 4,821,186

[45] Date of Patent: Apr. 11, 1989

[54] BAR CODE READING ELECTRONIC CASH REGISTER HAVING AN AUTOMATIC DISCOUNT FUNCTION

[75] Inventors: Kazuhiko Munakata, Chiba; Shigeki Kayama, Takatsuki, both of Japan

[73] Assignee: Omron Tateisi Electronics Co., Kyoto, Japan

[21] Appl. No.: 11,757

[22] Filed: Feb. 6, 1987

[30] Foreign Application Priority Data

Feb. 10, 1986 [JP] Japan ................................. 61-27299

[51] Int. Cl.[4] ............................................. G06F 15/21
[52] U.S. Cl. .................................... 364/405; 235/378
[58] Field of Search ................. 364/405; 235/378, 383

[56] References Cited

U.S. PATENT DOCUMENTS

| 3,959,624 | 5/1976 | Kaslow | 235/487 X |
| 4,554,446 | 11/1985 | Murphy | 235/385 X |
| 4,679,154 | 7/1987 | Blanford | 364/405 X |
| 4,707,785 | 11/1987 | Takagi | 364/405 |
| 4,757,448 | 6/1988 | Takagi | 364/405 |

Primary Examiner—Jerry Smith
Assistant Examiner—Steven G. Kibby
Attorney, Agent, or Firm—Stevens, Davis, Miller & Mosher

[57] ABSTRACT

An electronic cash register stores data on discounts concerning commodities to which an in-store marking bar code is attached. When this bar code is read, data on a discount corresponding to the department code contained in the bar code is read, a discount is made on the unit price data contained in the bar code on the basis of the discount data, and the discounted price data is registered.

6 Claims, 3 Drawing Sheets

| PLU | 31 |
|---|---|
| PLU | 32 |
| SDP | 33 |
| ⋮ | |
| PLU | 34 |
| SDP | 35 |

FIG. 4

| DEPARTMENT CODE | 311 |
|---|---|
| TITLE | 312 |
| TAXABLE CONDITION | 313 |
| UNIT PRICE | 314 |
| TOTALIZER | 315 |
| COUNTER | 316 |

| DEPARTMENT CODE | 331 |
|---|---|
| TITLE | 332 |
| TAXABLE CONDITION | 333 |
| DISCOUNT CODE | 334 |
| TOTALIZER | 335 |
| COUNTER | 336 |

| DISCOUNT CODE | 1 | 2 | — | — | 150 | 100 | 200 |
|---|---|---|---|---|---|---|---|
| DISCOUNT AMOUNT | 5 | 10 | — | — | 20 | 25 | 30 |

$\left.\begin{array}{l}0\ 1\\ 0\ 2\end{array}\right\}$ X X X X X C/D P1 P2 P3 P4 C/D

P1 P2 P3 P4 : PRICE
C/D : CHECK DIGIT
X X X X X : SUB-DEPARTMENT CODE

BAR CODE READING ELECTRONIC CASH REGISTER HAVING AN AUTOMATIC DISCOUNT FUNCTION

TECHNICAL FIELD

This invention relates to electronic cash registers (hereinafter referred to as the ECRs) and more particularly to an ECR which registers data on a commodity by reading bar codes attached to the commodity using a scanner.

BACKGROUND OF THE INVENTION

There are two known methods for registering price data with an ECR: one which registers the department code and unit price data of commodities which customers have bought, by keying them in from a keyboard, and the other which reads the bar codes attached to commodities by using a scanner and registers data on the commodities. An ECR which reads the bar code using a scanner has the feature that there is no need for a register operator to input the department codes and unit price data of each commodity, so that the processing speed is increased.

There are also two types of bar code markings, one a so-called source marking which includes a bar code attached to a commodity in advance at a factory and the other a so-called in-store marking which includes a bar code attached to a commodity at a shop such as a supermarket. The source marking includes only a recorded department code while the in-store marking includes a department code as well as unit data. When the source marking is read, unit data corresponding to the department code contained in the bar code is read from a PLU (Price lookup) file contained in the ECR, on the basis of the department code, and registered. On the other hand, the in-store marking includes the department code and unit data, so that the department code and unit data contained in the bar code are registered without reading the unit data from the PLU file.

A supermarket or the like sometimes sells perishable foods, etc., at a discount for a period of time. In supermarkets or the like, generally, in-store markings are attached to perishable foods. In order to perform discount processing, the operator must key in the discount charge or rate from the keyboard before or after the operator reads the bar codes using the scanner. Thus, each time a customer buys a commodity to be discounted, the operator must key in the discount charge or rate from the key board. This operation may become complicated. The operator may sometimes forget a keying operation at the keyboard for discounting purposes and not reduce the price.

Therefore, it is a main object of this invention to provide an ECR which eliminates the keying operation by the operator at the keyboard and which performs an automatic discounting operation when data on a commodity with an in-store marking is registered.

SUMMARY OF THE INVENTION

This invention is an ECR which registers data on each commodity to which a bar code as a source marking is attached and a commodity to which a bar code as an in-store marking is attached, comprising: bar code read means for reading the bar codes; first store means for beforehand storing unit price data on each of the commodities to which the source marking is attached; second store means for beforehand storing data on a discount of each of the commodities to which the in-store marking is attached; and register processing means for reading from the first store means, in accordance with the reading of the bar code of the source marking, unit price data corresponding to the department code contained in the bar code and registering the read data, reading from the second store means data on a discount corresponding to the department code in that bar code in accordance with the reading of said bar code of said in-store marking, and discounting and registering a predetermined sum from the unit price data contained in the bar code on the basis of the data on the discount.

An ECR according to this invention beforehand stores data on a discount corresponding to a commodity to which an in-store marking is attached. When the bar code of the in-store marking is read, the data on the corresponding discount is read, a discount charge is subtracted from the unit data contained in the bar code and the result is registered. Therefore the operator can perform an automatic discounting operation without operating the keyboard.

BRIEF DESCRIPTION OF THE DRAWINGS

FIG. 4 is an example of the structure of a PLU and a subdepartment file.

FIG. 5 shows data stored in PLU files.

FIG. 6 shows data stored in the respective subdepartment files.

FIG. 7 shows a discount table.

FIG. 8 shows one example of an in-store marking.

DETAILED DESCRIPTION

Figure 2:
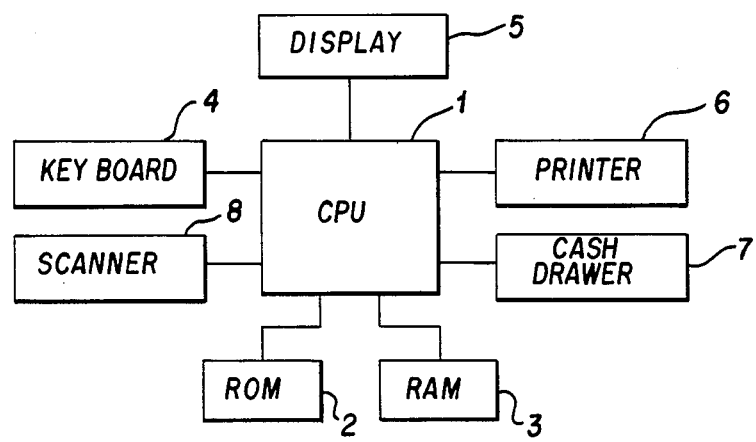
FIG. 2 is a schematic block diagram of one embodiment of this invention.
Figure 3:
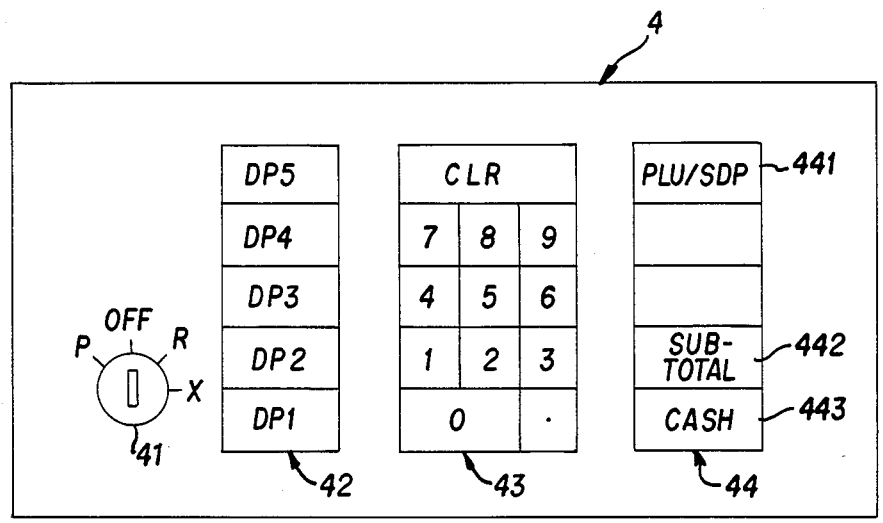
FIG. 3 shows a layout of keys of a keyboard shown in FIG. 2.

FIG. 2 is a schematic block diagram of one embodiment of this invention. FIG. 3 is a layout of keys at the keyboard shown in FIG. 2.

First the structure of one embodiment of this invention will be described with reference to FIGS. 2 and 3. As shown in FIG. 2, the ECR includes a CPU 1, a ROM 2, a RAM 3, a keyboard 4, a display 5, a printer 6, a cash drawer 7 and a scanner 8. CPU 1 registers data on commodities in accordance with a program stored in advance in ROM 2. RAM 3 includes a PLU file and a discount table such as is shown in FIGS. 4–7 to be described later. As shown in FIG. 4, keyboard 4 includes a mode selector switch 41, department keys 42, ten-keys 43 and function keys 44.

Mode selector switch 41 selects any one of a preset mode (P), a power source off (OFF), a register mode (R) and an inspection mode (X). Section keys 42 input a department code, and ten-keys 43 input money data on the cash which a customer pays. Function keys 44 include a PLU/SDP key 441, a subtotal key 442 and a deposit/current total cash key 443. PLU/SDP key 441 is operated when data on commodities is registered on the basis of a so-called price lookup (PLU) function which includes inputting a department code by operating the corresponding department key 42, and reading unit price data from the PLU file on the basis of the department code. Subtotal key 442 commands calculation of the total of the commodities registered so far. Deposit/current total key 443 performs a summing operation and commands calculation of the change due when data on the amount tendered by a customer is keyed in by ten-keys 43.

Display 5 displays the input department code of commodities, money data and the sum of money. Printer 6 prints these data on a receipt. Cash drawer 7 keeps money which a customer has paid, and change. Scanner 8 reads a bar code attached to a commodity. ECR shown in FIG. 2 can register data on a commodity by keying in the data from keyboard 4, as described above. ECR can also read a bar code attached to the commodity using scanner 8 and register data on the commodity.

FIG. 4 is a view showing an example of the structure of a PLU and subdepartment file. FIG. 5 is a view showing data stored in the respective PLU files. FIG. 6 is a view showing data stored in the respective subdepartment files. FIG. 7 is a view showing a discount table.

The PLU and subdepartment files shown in FIG. 4 are contained in RAM 3 shown in FIG. 2 and include areas 31, 32, 34 for storing a plurality of PLU records, and areas 33 and 35 for storing SDP records. For example, PLU record 31 includes an area 311 for storing department codes, an area 312 for storing the names of the commodities, an area 313 for storing data as to whether the commodity is a taxable commodity or not, etc., an area 314 for storing the unit prices of commodities belonging to that department, an area 315 as a summing unit or totalizer for storing the sum total of bought commodities belonging to that department, and an area 316 for counting events of registration. Other areas 32 and 34 for storing PLU records are also composed like area 31.

Subdepartment file 33 includes areas 331–336 similar to areas 311–316 of area 31 which stores the PLU records. However, a discount code is stored in area 334 of subdepartment file 33, and unit price data is not.

Discount codes corresponding to the respective discounts are recorded on a discount table 36 shown in FIG. 7 and a discount is designated by a discount code stored in area 334 of the subdepartment file.

FIG. 8 shows one example of an in-store marking. In this embodiment, the first 2-figure numerals "01", "02" represent an in-store marking. The next 5-figure numerals specify the subdepartment code. The next C/D is a check digit for the subdepartment code. The next 4-figure numerals P1–P4 specify the unit price of the commodity. The next C/D is a check digit for the unit price.

Figure 1:
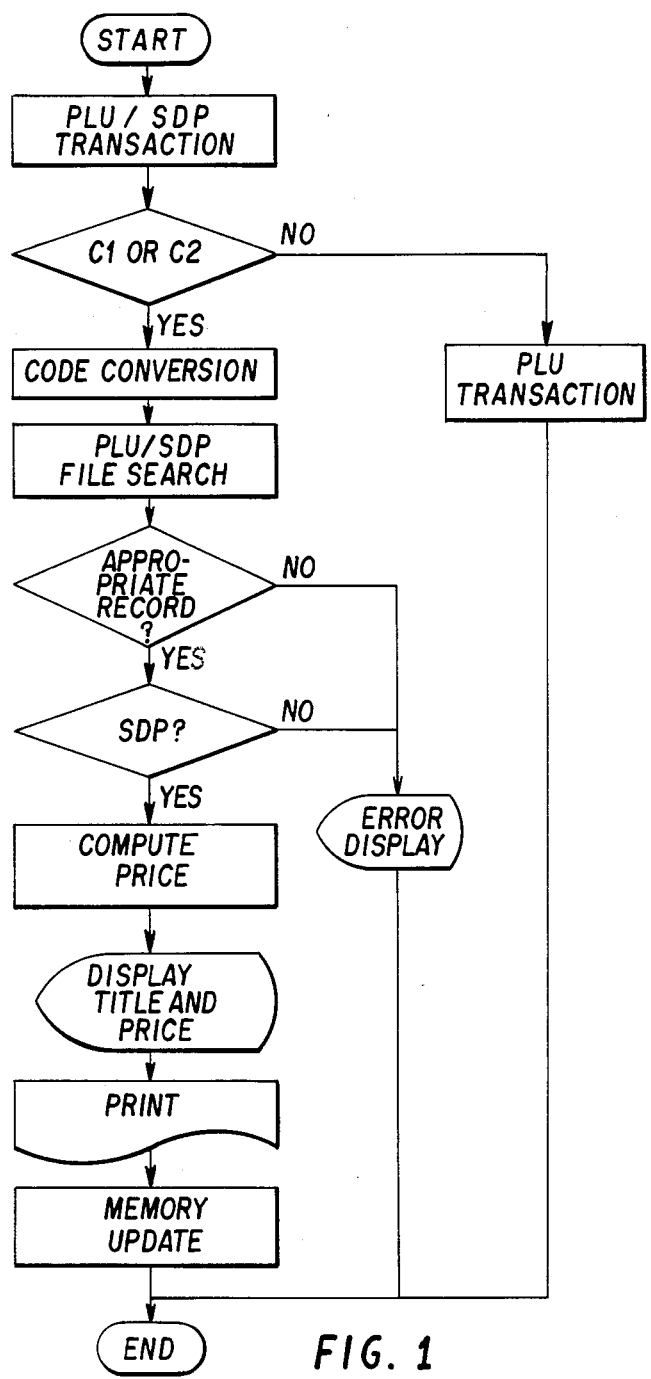
FIG. 1 is a flowchart for explaining the specific operation of one embodiment of this invention.

FIG. 1 is a flowchart for explaining the specific operation of one embodiment of this invention.

Now, referring to FIGS. 1–8, the specific operation of one embodiment of this invention will be described. The operator reads a bar code attached to an commodity bought by a customer, using scanner 8. The reading output of scanner 8 is applied to CPU 1 which checks if the header of the read bar code contains the 2-figure numerals "01" or "02". If not, CPU determines that the bar code is a source marking, searches PLU and subdepartment files on the basis of the department code contained in the bar code, reads unit price data corresponding to the appropriate department code and performs a so-called PLU registration. This PLU registration is conventionally well known and therefore a detailed description thereof will be omitted.

If the read bar code contains the 2-figure numerals "01" or "02" in its header the CPU stores the unit price data contained in the bar code in an area (not shown) of RAM 3 and converts the unit price data field of the bar code to "00000". The CPU searches PLU and subdepartment files on the basis of the converted bar code. The CPU checks if there is a SDP record corresponding to the department code contained inthe bar code. If there is an appropriate SDP record, the CPU checks if the set requirements in the area of the record are a subdepartment file. If there is no appropriate record or there is no set requirements of the subdepartment file in the appropriate record, CPU performs an error display.

If there is the set requirements of the subdepartment file, a discounted price is computed. Namely, CPU reads a discount code from area 334 of the subdepartment record, reads a discount corresponding to the discount code from the discount table, and computes the selling price by subtracting the discount from the unit price data contained in the bar code. The, the CPU reads the name of the commodity from area 332, causes the display 5 to display the name and selling price of the commodity, and causes printer 6 to print a receipt. The CPU updates summing unit or totalizer of the subdepartment records of the commodities and counter 336 along with the summing unit and counter, for example, of PLU record 32 to which the subdepartment record belongs to complete the series of operations.

While in the above description the CPU has been described as storing a discount code in the subdepartment record and storing in discount table 36 a discount corresponding to the discount code, it may store not a discount code but a discount rate in advance in the subdepartment record without providing a discount table. The CPU may then compute a discount by multiplying a discount rate by unit data contained in the bar code and compute the selling price by subtracting the discount from the unit price data.

As described above, according to this invention, in accordance with the reading of the bar code of an in-store marking, data on a discount corresponding to the department code contained in the bar code is read, a discount is made on the unit price data contained in the bar code on the basis of the data on the discount, and the discounted price data is registered, so that it is unnecessary for the operator to operate the keyboard, and discount procesing is performed automatically.

What is claimed is:

1. An electronic cash register for registering data concerning commodities having an associated source marking bar code including a department code, and commodities having an associated in-store marking bar code including a department code and unit price data, said register comprising:

bar code reading means for reading said source marking and in-store marking bar codes;

first means for storing unit price data corresponding to the department code for each of the commodities having a source marking bar code;

second means for storing discount data corresponding to the department code for at least some commodities having an in-store marking bar code; and register processing means for: 1) reading from said first means, in accordance with a reading of said source marking bar code by said bar code reading means, unit price data corresponding to the department code contained in the source marking bar code and registering the read data, and 2) reading from said second means, in accordance with a reading of the in-store marking bar code by said bar code reading means, discount data corresponding to the department code contained in said in-store marking bar code, and registering a sum based on the unit price data contained in the in-store bar code as discounted in accordance with the read discount data.

2. An electronic cash register as in claim 1 wherein said discount data contained in said second means points to a discount storage location containing a discount rate which said register processing means retrieves and uses in said discounting operation.

3. An electronic cash register as in claim 1 wherein said discount data is a discount rate which said register processing means uses in said discounting operation.

4. An electronic cash register for registering data concerning commodities having associated bar codes, each bar code including a department code and unit price data, said register comprising:

bar code reading means for reading said bar codes:

storage means for storing discount data corresponding to the department code for at least some commodities associated with said bar codes; and register processing means for reading a said bar code and, in response thereto, for reading from said storing means discount data corresponding to a department code contained in a read bar code, and registering a sum based on the unit price data contained in the read bar code as discounted in accordance with the read discount data.

5. An electronic cash register as in claim 4 wherein said discount data contained in said storage means points to a discount storage location containing a discount rate which said register processing mans retrieves and uses in said discounting operation.

6. An electronic cash register as in claim 4 wherein said discount data is a discount rate which said register processing means uses in said discounting operation.

* * * * *